United States Patent
Krishnamurthy et al.

(10) Patent No.: US 11,317,020 B1
(45) Date of Patent: Apr. 26, 2022

(54) GENERATING TIME-LAPSE VIDEOS WITH AUDIO

(71) Applicant: GoPro, Inc., San Mateo, CA (US)

(72) Inventors: Naveen Chinya Krishnamurthy, Fremont, CA (US); Shiva Kumar Belavadi Mallegowda, Belmont, CA (US); Anandhakumar Chinnaiyan, Fremont, CA (US); Aditi Saha, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/111,790

(22) Filed: Dec. 4, 2020

Related U.S. Application Data

(60) Provisional application No. 62/944,526, filed on Dec. 6, 2019.

(51) Int. Cl.
*H04N 5/232* (2006.01)
*H04N 5/225* (2006.01)
*H04R 1/08* (2006.01)

(52) U.S. Cl.
CPC ....... *H04N 5/23232* (2013.01); *H04N 5/2252* (2013.01); *H04N 5/2253* (2013.01); *H04N 5/2254* (2013.01); *H04N 5/23216* (2013.01); *H04R 1/08* (2013.01)

(58) Field of Classification Search
CPC .......... H04N 5/23232; H04N 5/23216; H04N 5/2253; H04N 5/2252; H04N 5/2254; H04R 1/08
See application file for complete search history.

(56) References Cited

U.S. PATENT DOCUMENTS

| | | | |
|---|---|---|---|
| 10,083,360 B1 * | 9/2018 | Woolley | G11B 27/005 |
| 2014/0186006 A1 * | 7/2014 | Jin | H04N 5/783 386/230 |
| 2016/0094801 A1 * | 3/2016 | Beysserie | H04N 5/91 386/226 |
| 2017/0187954 A1 * | 6/2017 | Fukuya | H04N 5/23216 |

* cited by examiner

*Primary Examiner* — Padma Haliyur
(74) *Attorney, Agent, or Firm* — Esplin & Associates, PC

(57) ABSTRACT

An image capture device may capture visual content based on a time-lapse video frame rate. Audio content may be captured along with the visual content based on the time-lapse video frame rate being a specific value and/or falling within a range of values.

16 Claims, 5 Drawing Sheets

GENERATING TIME-LAPSE VIDEOS WITH AUDIO

FIELD

This disclosure relates to generating time-lapse videos with audio.

BACKGROUND

Time-lapse capture of visual content may enable playback in which time appears to be moving at a fast rate. Lack of audio content in playback of such content may decrease user engagement with the content.

SUMMARY

This disclosure relates to generating time-lapse videos with audio. An image capture device may include a housing. The housing may carry one or more of an image sensor, an optical element, a sound sensor, and/or other components. The image sensor may generate a visual output signal conveying visual information defining visual content based on light guided thereto by the optical element. The sound sensor may generate a sound output signal conveying audio information defining audio content based on sound received by the sound sensor. A time-lapse video frame rate may be determined. The time-lapse video frame rate may define a rate at which the visual content is captured as time-lapse video frames based on the visual output signal. The time-lapse video frame rate may have one or more values defining the rate at which the visual content is captured as the time-lapse video frames.

The visual content may be captured during a visual capture duration based on the time-lapse video frame rate and/or other information. The audio content may be captured during an audio capture duration based on the time-lapse video frame rate and/or other information. Video content of a time-lapse video may be generated to include the captured visual content and the captured audio content. The captured visual content may be defined within the time-lapse video frames of the video content and the captured audio content may provide audio for playback of at least some of the time-lapse video frames.

An electronic storage may store information relating to time-lapse video frame rate, visual information defining visual content, information relating to visual content, audio information defining audio content, information relating to audio content, information relating to capture of visual content, information relating to capture of audio content, information relating to video content, information relating to generation of video content, and/or other information.

The housing may carry one or more components of the image capture device. The housing may carry (be attached to, support, hold, and/or otherwise carry) one or more of an image sensor, an optical element, a sound sensor, a processor, an electronic storage, and/or other components.

The image sensor may be configured to generate a visual output signal and/or other output signals. The visual output signal may convey visual information based on light that becomes incident thereon and/or other information. The visual information may define visual content.

The optical element may be configured to guide light within a field of view to the image sensor. In some implementations, the field of view may be greater than 180 degrees. In some implementations, the field of view may be 180 degrees. In some implementations, the field of view may be less than 180 degrees.

The sound sensor may be configured to generate a sound output signal and/or or output signals. The sound output signal may convey audio information based on sound received by the sound sensor. The audio information may define audio content.

The processor(s) may be configured by machine-readable instructions. Executing the machine-readable instructions may cause the processor(s) to facilitate generation of time-lapse videos with audio. The machine-readable instructions may include one or more computer program components. The computer program components may include one or more of a frame rate component, a visual content component, an audio content component, a video content component, and/or other computer program components.

The frame rate component may be configured to determine a time-lapse video frame rate. The time-lapse video frame rate may define a rate at which the visual content is captured as time-lapse video frames based on the visual output signal and/or other information. The time-lapse video frame rate may have one or more values defining a particular rate at which the visual content is captured as the time-lapse video frames.

In some implementations, the time-lapse video frame rate may be determined based on user interaction with the image capture device, motion of the image capture device, analysis of content captured by the image capture device, highlight detection, and/or other information.

The visual content component may be configured to capture the visual content during a visual capture duration based on the time-lapse video frame rate and/or other information. Capturing the visual content may include recording, storing, and/or otherwise capturing the visual content for use in generating video content. Capturing the visual content may be separate from use of the visual content for other purposes, such as monitoring and/or analyzing the visual content for detecting one or more moments of interest.

In some implementations, the image sensor may operate at a higher rate than the time-lapse video frame rate. The capture of the visual content as the time-lapse video frames may include selection of fewer than all images generated by the image sensor for generation of the time-lapse video frames. In some implementations, the images may be selected for the generation of the time-lapse video frames based on motion of the image capture device and/or other information.

The audio content component may be configured to capture the audio content during an audio capture duration based on the time-lapse video frame rate and/or other information. Capturing the audio content may include recording, storing, and/or otherwise capturing the audio content for use in generating video content. Capturing the audio content may be separate from use of the audio content for other purposes, such as monitoring and/or analyzing the audio content for detecting one or more moments of interest.

In some implementations, capture of the audio content during the audio capture duration based on the time-lapse video frame rate may include a determination that the time-lapse video frame rate has changed into a target time-lapse video frame rate. Responsive to the determination that the time-lapse video frame rate has changed into the target time-lapse video frame rate, the capture of the audio content may be started. Capture of the audio content during the audio capture duration based on the time-lapse video frame rate may include a determination that the time-lapse video frame rate has changed from the target time-lapse video frame rate to a different time-lapse video frame rate. Responsive to the determination that the time-lapse video frame rate has changed from the target time-lapse video frame rate to the different time-lapse video frame rate, the capture of the audio content may be stopped.

In some implementations, the target time-lapse video frame rate may include a single value. In some implementations, the single value of the target time-lapse video frame rate may be the same as a value of a visual content playback rate. The visual content playback rate may define a rate at which the visual content is presented on playback.

In some implementations, the target time-lapse video frame rate may include multiple values. The multiple values may define different values of the target time-lapse video frame rate. The multiple values may define one or more ranges of values of the target time-lapse video frame rate.

The video content component may be configured to generate video content of one or more time-lapse videos. A time-lapse video may have a visual content playback rate that is faster than the time-lapse video frame rate for at least a part of a progress length of the video content.

The video content may include the captured visual content, the captured audio content, and/or other content. The captured visual content may be defined within one or more time-lapse video frames of the video content. The captured audio content may provide audio for playback of at least some of the time-lapse video frames.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
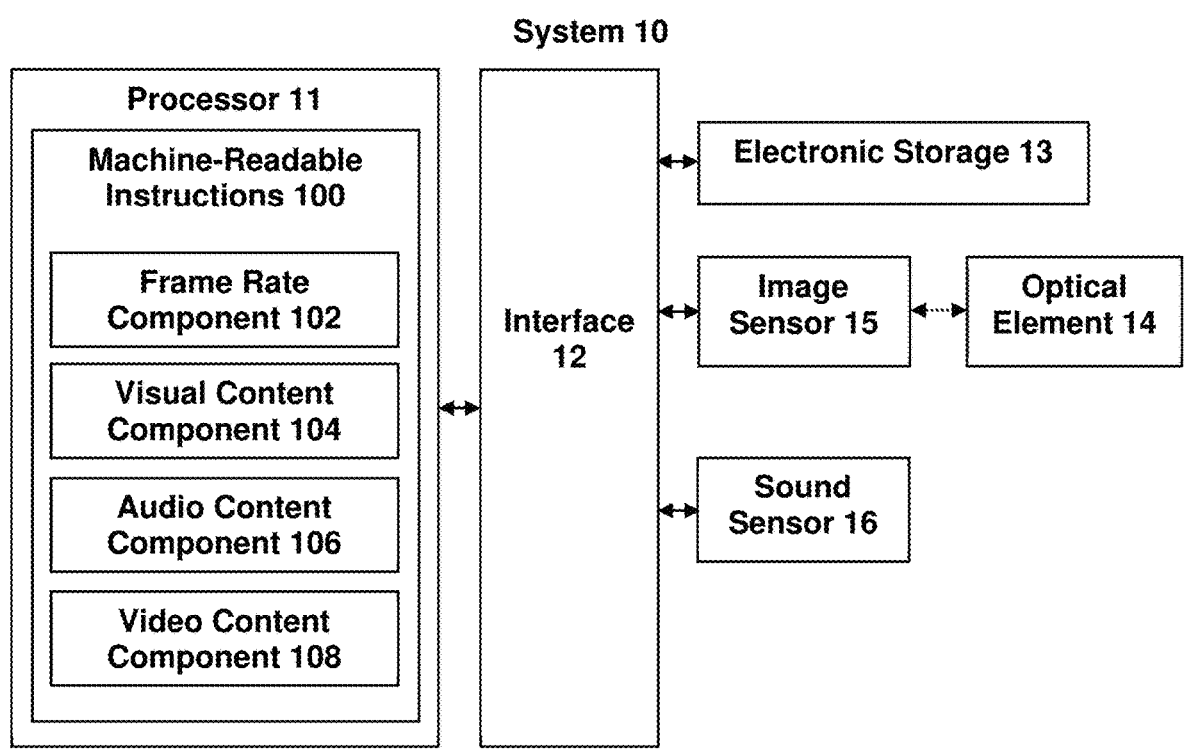
FIG. 1 illustrates an example system that generates time-lapse videos with audio.

FIG. 1 illustrates a system 10 for generating time-lapse videos with audio. The system 10 may include or be part of an image capture device. The system 10 may include one or more of a processor 11, an interface 12 (e.g., bus, wireless interface), an electronic storage 13, an optical element 14, an image sensor 15, a sound sensor 16, and/or other components. One or more components of the system 10 may be carried by a housing of an image capture device. The image sensor 15 may generate a visual output signal conveying visual information defining visual content based on light guided thereto by the optical element 14. The sound sensor 16 may generate a sound output signal conveying audio information defining audio content based on sound received by the sound sensor. The processor 11 may determine a time-lapse video frame rate. The time-lapse video frame rate may define a rate at which the visual content is captured as time-lapse video frames based on the visual output signal. The time-lapse video frame rate may have one or more values defining the rate at which the visual content is captured as the time-lapse video frames.

The processor 11 may capture the visual content during a visual capture duration based on the time-lapse video frame rate and/or other information. The processor 11 may capture the audio content during an audio capture duration based on the time-lapse video frame rate and/or other information. Video content of a time-lapse video may be generated by the processor 11 to include the captured visual content and the captured audio content. The captured visual content may be defined within the time-lapse video frames of the video content and the captured audio content may provide audio for playback of at least some of the time-lapse video frames.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to time-lapse video frame rate, visual information defining visual content, information relating to visual content, audio information defining audio content, information relating to audio content, information relating to capture of visual content, information relating to capture of audio content, information relating to video content, information relating to generation of video content, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), sound sensor(s), touchscreen display(s), button(s), and/or motion sensor(s) of the system 10 may be carried by the housing of the image capture device. The housing may carry other components, such as the processor 11 and/or the electronic storage 13. References to a housing of an image capture device may refer to the image capture device, and vice versa. For example, references to position/motion of a housing of an image capture device may refer to position/motion of the image capture device, and vice versa.

Figure 3:
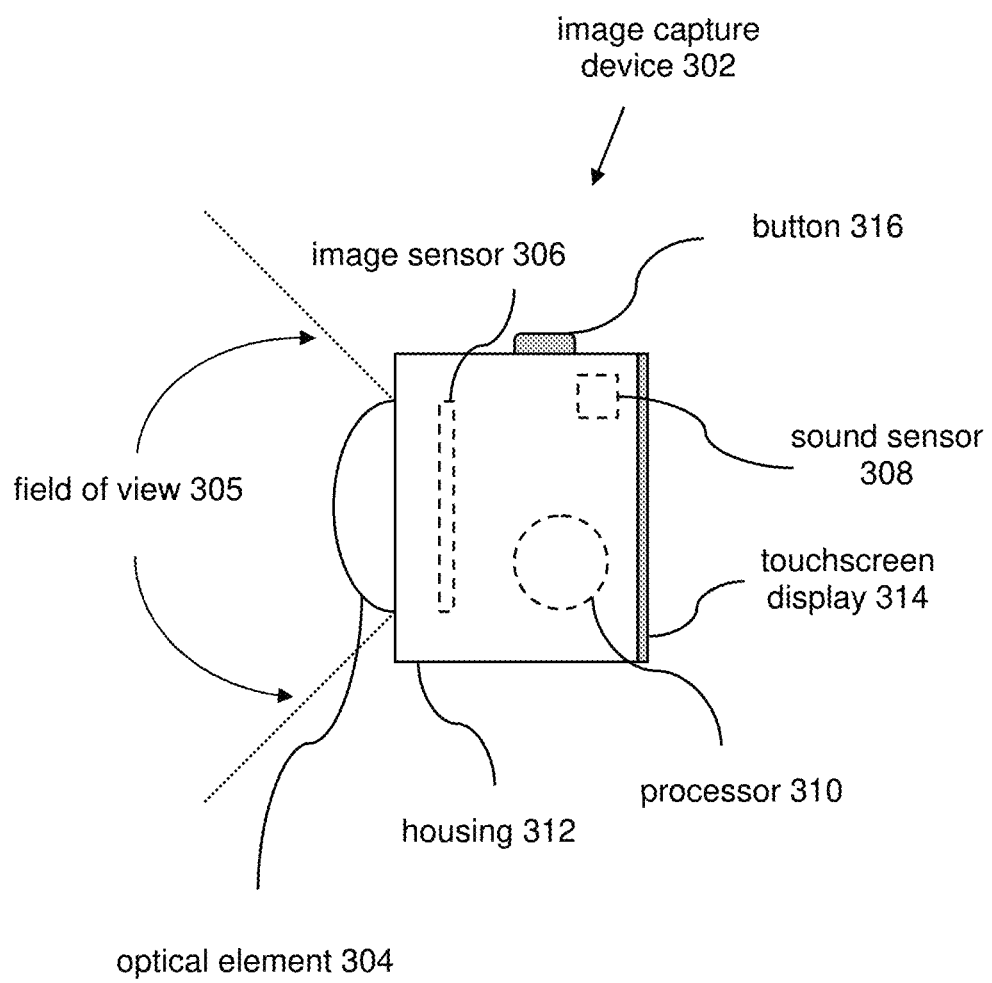
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) one or more of an optical element 304, an image sensor 306, a sound sensor 308, a processor 310, a touchscreen display 314, a button 316, and/or other components. The image capture device 302 may include other components not shown in FIG. 3, such as a motion sensor. The image capture device 302 may not include one or more components shown in FIG. 3, such as the touchscreen display 314 or the button 316. Other configurations of image capture devices are contemplated.

One or more components of the image capture device 302 may be the same as, be similar to, and/or correspond to one or more components of the system 10. For example, the optical element 304 may be the same as, be similar to, and/or correspond to the optical element 14. The image sensor 306 may be the same as, be similar to, and/or correspond to the image sensor 15. The sound sensor 308 may be the same as, be similar to, and/or correspond to the sound sensor 16. The processor 308 may be the same as, be similar to, and/or correspond to the processor 11.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

In some implementations, the field of view 305 may be larger than a size of the punchout/viewing window used to generate time-lapse video frames. For example, a punchout/viewing window within the visual content may be used to stabilize visual content captured by the image capture device 302 and the stabilized visual content may be included within the time-lapse video frames. Stabilization of visual content may include reduction, removal, and/or smoothing of motion present in the visual content due to motion (e.g., mechanical displacement, rotational motion, translational motion) of the image capture device 302 during visual content capture. Motion of the image capture device 302 during visual content capture may result in motion within the captured visual content. For example, shaking of the image capture device 302 during visual content capture may result in shaky motion within the captured visual content. Such motion within the visual content may be unintentional and/or not be desirable. Such motion may become more pronounced in time-lapse videos due to increase in perceived playback speed of the time-lapse videos.

Portions of the visual content captured from light within the field of view 305 may be presented on a display and/or used to generate time-lapse video frames. The portions of the visual content presented on the display/used to generate time-lapse video frames may include those portions of the visual content within a viewing window. A viewing window may define extents of the visual content (e.g., of image(s)/video frame(s)) to be included within a punchout. The viewing window may be determined so that the visual content within the presentation/time-lapse video frames do not include, include less motion, or include smoother motion than the visual content. For instance, the visual content may include shaky/jerky footage due to motion of the image capture device 302 during visual content capture, and the viewing window may be determined so that the portion of the visual content that is presented/used for time-lapse video frame generation does not appear shaky/jerky or appears less shaky/jerky. For example, the shape, size, and/or the location of the viewing window within the visual content may be determined to compensate for motion of the image capture device 302 during capture such that the time-lapse video frames appear to have been captured from an image capture device 302 with less/smoother motion. That is, the visual content captured by the image capture device 302 may be cropped to generate time-lapse video frames that are stabilized.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The sound sensor 308 include sensor(s) (e.g., microphone, component(s) of microphone) that converts received sounds into output signals. The output signals may include electrical signals. The sound sensor 308 may generate output signals conveying information based on sounds received by the sound sensor 308. For example, sound sensor 308 may be configured to generate a sound output signal conveying audio information based on the received sounds. The audio information may define audio content. The audio information may define audio content by including information that defines one or more content, qualities, attributes, features, and/or other aspects of the audio content. For example, the audio information may define audio content by including information that makes up the content of the audio, and/or information that is used to determine the content of the audio. The audio content may include one or more reproductions of the received sounds. The audio information may define audio content in one or more formats, such as WAV, MP3, MP4, RAW, and/or other formats. The audio information may be stored in one or more locations, such as an electronic storage, storage of the sound sensor 308, remote storage, and/or other locations. While the sound sensor 308 is shown to be carried by the housing 312 in FIG. 3, this is merely an example and is not meant to be limiting. The sound sensor 308 may be remote/separate from the image capture device 302.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), facilitate operation of the image sensor 306 (e.g., change how the received light is converted into information that defines images/videos and/or how the images/videos are post-processed after capture), and/or facilitate operation of the sound sensor 308 (e.g., change how the received sound is converted into information that defines audio content and/or how the audio content post-processed after capture).

The processor 310 may obtain information from the image sensor 306 and/or the sound sensor 308, and/or facilitate transfer of information from the image sensor 306 and/or the sound sensor 308 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The image capture device 302 may include other sensors, such as one or more motion sensors. A motion sensor may refer to one or more sensors that converts experienced motions into output signals. The output signals may include electrical signals. A motion sensor may generate output signals conveying information that characterizes motions and/or positions of the motion sensor and/or device(s) carrying the motion sensor, such as the image capture device 302. The motions/positions characterized by a motion sensor may include translational motions/positions and/or rotational motions/positions. For example, a motion sensor may refer to a set of motion sensors, which may include one or more inertial measurement units, one or more accelerometers, one or more gyroscopes, and/or other motion sensors.

A display may refer to an electronic device for visually presenting information. A display may include one or more screens. A display may be used to present visual content (of images, of videos) captured by the image capture device 302. A display may be used to present previews of visual content captured or to be captured by the image capture device 302. A display may be used to present other visual information, such as settings for the image capture device 302 and/or messages (e.g., warnings, alerts, reminders) for the user of the image capture device 302. In some implementations, the display 322 may include a touchscreen display, such as the touchscreen display 314. A touchscreen display may be configured to receive user input via user engagement with the touchscreen display. A user may engage with the touchscreen display via interaction with one or more touch-sensitive surfaces/screens and/or other components of the touchscreen display.

The touchscreen display 314 may be configured to present visual content (e.g., visual content captured by the image capture device 302, graphical user interface). The touchscreen display 314 may be configured to receive user input.

The touchscreen display 314 may be configured to generate output signals indicating location of user interaction (e.g., a user's engagement) with the touchscreen display 314. User interaction with the touchscreen display 314 may be received/determined based on the touchscreen output signals. The touchscreen display 314 may be interacted upon by a user to provide one or more commands to the image capture device 302. For example, a user may interact with the touchscreen display 314 to provide one or more commands to the image capture device 302 to change the rate at which time-lapse video frames are generated by the image capture device 302.

The touchscreen display 314 may include one or more touch-sensitive screens and/or other components. A user may interact with the touchscreen display 314 by touching one or more portions of a touch-sensitive screen (e.g., with one or more fingers, stylus). A user may interact with the touchscreen display 314 at a moment in time, at multiple moments in time, during a period, and/or during multiple periods. A user may tap on or move along the touchscreen display 314. For example, a user may tap on one or more portions of the touchscreen display 314 (e.g., any portion of the touchscreen display 314, a portion of the touchscreen display 314 corresponding to an element of the graphical user interface presented on the touchscreen display 314, a portion of the touchscreen display 314 corresponding to an option to change time-lapse video frame rate) to interact (e.g., engage, toggle, manipulate) with the touchscreen display 314. A user may make a moving motion (e.g., holding one or more fingers on the touchscreen display 314 and moving the finger(s) in one or more particular directions) to interact with the touchscreen display 314.

The button 316 may refer to one or more mechanisms that may be physically interacted upon by a user. The button 316 may be interacted upon by a user to operate the button 316 and provide one or more commands to the image capture device 302. For example, a user may interact with the button 316 to provide one or more commands to the image capture device 302 to change the rate at which time-lapse video frames are generated by the image capture device 302. User interaction with the button 316 may include one or more of pressing the button 316, pulling the button 316, twisting the button 316, flipping the button 316, and/or other interaction with the button 316. The button 316 may include a dedicated button with the interaction of the button 316 causing specific operation/functionality (e.g., set/change time-lapse video frame rate). The button 316 may include a multi-purpose button with the interaction of the button 316 causing different operations/functionalities (e.g., based on different context in which the image capture device 302 is operating, based on user specifying the use of the button 316).

The image capture device 302 may capture visual content during a visual capture duration and may capture audio content during an audio capture duration. The visual content, the audio content, and/or other content may be captured by the image capture device 302 for generation of video content. The captured visual content and the captured audio content may be used to generate video content of a video. For example, captured visual content may be used to generate video frames of a time-lapse video, and the captured audio content may provide audio for playback of some or all of the video frames of the time-lapse video.

Referring back to FIG. 1, the processor 11 (or one or more components of the processor 11) may be configured to obtain information to facilitate generating time-lapse videos with audio. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a sound sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate generation of time-lapse videos with audio. The machine-readable instructions 100 may include one or more computer program components. The machine-readable instructions 100 may include one or more of a frame rate component 102, a visual content component 104, an audio content component 106, a video content component 108, and/or other computer program components.

The frame rate component 102 may be configured to determine a time-lapse video frame rate. Determining a time-lapse video frame rate may include ascertaining, establishing, finding, setting, causing, and/or otherwise determining the time-lapse video frame rate. For example, the frame rate component 102 may be configured to find out with what time-lapse video frame rate an image capture device is capturing visual content and/or generating time-lapse video frames. The frame rate component 102 may be configured to set the value of the time-lapse video frame rate that an image capture device is to use in capturing visual content and/or generating time-lapse video frames. Setting the value of the time-lapse video frame rate may include setting the time-lapse video frame rate to a particular value, increasing the value of the time-lapse video frame rate, decreasing the value of the time-lapse video frame rate, and/or maintaining the value of the time-lapse video frame rate.

The time-lapse video frame rate may define a rate at which the visual content is captured as time-lapse video frames based on the visual output signal generate by image sensor(s) and/or other information. The time-lapse video frame rate may refer to a frequency at which the visual content is captured as time-lapse video frames. For example, time-lapse video frame rate may define a number of images/video frames that are captured per a time duration (e.g., number frames per second). A visual content playback rate may define a rate at which visual content is presented on playback. A visual content playback rate may define a rate at which visual content/images/video frames are displayed per a time duration. A visual content playback rate may refer to a frequency at which the visual content/images/video frames are displayed. For example, a visual content playback rate may define a number of images/video frames that are displayed per a time duration (e.g., # frames per second). Difference in the time-lapse video frame rate and the visual content playback rate may result in a perceived playback speed of the time-lapse videos. The perceived playback speed of the time-lapse videos may refer to the speed with which the time-lapse video appears to be played. The perceived playback speed of the time-lapse video may include a normal perceived playback speed (1× speed), an increased perceived playback speed (e.g., 2× speed, 10× speed), and/or a decreased perceived playback speed (e.g., 1/10× speed, 1/2× speed).

For example, the time-lapse video frame rate at which the visual content is captured may be more spread out than a visual content playback rate of the video content generated from the captured visual content. That is, the time-lapse video frame rate may be lower than the visual content playback rate. For example, the visual content may be captured at a time-lapse video rate of 1 video frame per second while the video content generated from the captured visual content may be played at visual content playback rate of 30 video frames per second. Such a difference in the time-lapse video frame rate and the visual content playback rate may make the video content to appear to be played with a 30× increase in speed. Such a difference in the time-lapse video frame rate and the visual content playback rate may facilitate generation of a time-lapse video using the captured visual content. Other time-lapse video frame rate and visual content playback rate are contemplated.

Capturing visual content as time-lapse video frames may include generating time-lapse video frames to include some or all of the captured visual content. A time-lapse video frame may refer to a video frame to be included within a time-lapse video. A time-lapse video frame may refer to a video frame of a time-lapse video. The time-lapse video frame rate may define a rate at which the time-lapse video frames are generated based on visual content captured by one or more image sensors (e.g., the image sensor 306). The visual content may be captured as time-lapse video frames by image sensor(s) at moments in accordance with the time-lapse video frame rate. The time-lapse video frame rate may be used to determine, based on moment of capture, which visual content will be included in the time-lapse video as time-lapse video frames. Visual content included in the time-lapse video frames may include the entirety of the visual content captured by the image sensor(s) and/or portions of the visual content captured by the image sensor(s).

The time-lapse video frames may be generated as one or more of an image frame, frame of pixels, encoded frame (e.g., I-frame, P-frame, B-frame), and/or other video frames. For example, individual time-lapse video frames may be generated as I-frames (intra-coded images including complete images). In some implementations, encoding of the time-lapse video frames may be determined based on amount of changes in the content of adjacent time-lapse video frames. For example, based on the amount of changes in the content of adjacent time-lapse video frames exceeding a threshold, the time-lapse video frames may be encoded as I-frames. Based on the amount of changes in the content of adjacent time-lapse video frames not exceeding a threshold, one or more of the time-lapse video frames may be encoded as P-frame(s) (predicted image(s) including/using changes from preceding time-lapse video frame) and/or B-frame(s) (bidirectional predicted image(s) including/using changes from both preceding and following time-lapse video frame).

In some implementations, encoding of the time-lapse video frames may be determined based on the time-lapse video frame rate. Faster time-lapse video frame rate may generally lead to generation of adjacent time-lapse video frames with less difference in content than slower time-lapse video frame rate. The time-lapse video frame rate may be used in place of content analysis to determine whether the time-lapse video frames will be generated as one or more of I-frames, P-frames, B-frames, and/or other frames. Other encoding and generation of time-lapse video frames are contemplated.

In some implementations, capture of visual content as time-lapse video frames based on the time-lapse video frame rate may include capture of images by the image capture device based on the time-lapse video frame rate and/or other information. That is, the rate at which the image capture device captures images (e.g., sampling rate) may be set based on (e.g., same as, multiple of) the time-lapse video frame rate. Setting of the capture rate of the image capture device based on the time-lapse video frame rate may enable the image capture device to minimize/reduce the number of images that are captured to generate a time-lapse video. Such capture of images may enable the image capture device to conserve resources (e.g., battery, processing power, memory) when capturing time-lapse videos.

In some implementations, capture of visual content as time-lapse video frames based on the time-lapse video frame rate may include selection of the time-lapse video frames from images/portions of images captured by the image capture device based on the time-lapse video frame rate and/or other information. For example, the image capture device may capture images at a certain capture rate, and the time-lapse video frame rate may be used to select some or all of the captured images for inclusion as time-lapse video frames in a time-lapse video. That is, the time-lapse video frame rate may be used to select which of the captured images will be used as time-lapse video frames of a time-lapse video.

The time-lapse video frame rate may have one or more values defining a particular rate at which the visual content is captured as the time-lapse video frames. The value(s) may characterize, reflect, specify, and/or otherwise define the rate at which the visual content is captured. The rate at which the visual content is captured may be determine based on the value(s) of the time-lapse video frame rate. For example, the value(s) of the time-lapse video frame rate may define how many time-lapse video frames are generated per a duration of time (e.g., number of time-lapse video frames per second/minute/hour). The value of the time-lapse video frame rate may be the same as the number of time-lapse video frames to be generated per a duration of time. The value of the time-lapse video frame rate be used to determine how many time-lapse video frames are generated per a duration of time.

For example, the value of the time-lapse video frame rate may be the value of the perceived-playback speed (e.g., 30×) to be achieved within the time-lapse video, and the number of time-lapse video frames to be generated per a duration of time may be determined based on the perceived-playback speed. The values of the time-lapse video frame rate may be the capture duration during which visual content is to be captured and the playback duration of the time-lapse video, and the number of time-lapse video frames to be generated per a duration of time may be determined based on the capture duration and the playback duration of the time-lapse video. Other types of values of the time-lapse video frame rate are contemplated.

The time-lapse video frame rate may be different from the visual content playback rate of a video (how many video frames are presented per a duration of time). The time-lapse video frame rate may be lower than the visual content playback rate. For example, video frames may be generated at a time-lapse video frame rate of 1 video frame per second while the generated video frames (included in a video) may be played at visual content playback rate of 30 video frames per second. Such a difference in the time-lapse video frame rate and the visual content playback rate may make the video to appear to be played with a 30× increase in speed (perceived-playback speed of 30×). Other time-lapse video frame rate and visual content playback rate are contemplated.

In some implementations, the value(s) of the time-lapse video frame rate may be determined based on user input, system default, and/or other information. For example, a user input may define a particular value of the time-lapse video frame rate to be used in generating time-lapse video frames. The image capture device may operate with a default value for the time-lapse video frame rate, which may be changed by a user. Other determination of the value(s) of the time-lapse video frame rate are contemplated.

The time-lapse video frame rate may change during capture of visual content and/or the generation of the time-lapse video frames. For example, the time-lapse video frame rate may be changed from one value to a different value defining a rate at which the visual content is captured/time-lapse video frames are generated. The capture of the visual content/generation of the time-lapse video frames based on the time-lapse video rate may be continued after the change in the value of the time-lapse video frame rate such that the time-lapse video frames include one set of time-lapse video frames (including one or more time-lapse video frames) generated based on the rate before the change, another set of time-lapse video frames including one or more time-lapse video frames) generated based on the changed rate, and/or other time-lapse video frames.

The time-lapse video frame rate may be changed without interrupting the capture of the visual content and/or the generation of the time-lapse video frames. The time-lapse video frames rate may be changed without stopping the capture of the visual content and/or the generation of the time-lapse video frames. For example, the image capture device may be used to record a time-lapse video. The time-lapse video frame rate may be dynamic during the recording of the time-lapse video and may be changed to provide different sped-up views of the captured content. For example, change in the time-lapse video frame rate may include recording of a time-lapse video where the time-lapse video frame rate transitions from one rate to different rate so that the footage in the time-lapse video includes a segments with one perceived playback speed and another segment with a different perceived playback speed. Different segments of the time-lapse video may be captured/generated at different rates so that content captured at different times are played back with different perceived playback speeds (e.g., 0.5×, 1×, 10×, 30×). The recording of the time-lapse video may not be interrupted by the change in time-lapse video frame rate.

For example, recording of a time-lapse video with perceived playback speed of 10× may not need to be stopped to start recording a time-lapse video with perceived playback speed of 30×. Rather, recording of the time-lapse video may transition from perceived playback speed of 10× to 30× without interruption in the recording. Rather than having a time-lapse video with a single perceived playback speed (e.g., 10×), use of the dynamic time-lapse video frame rate may enable generation of a time-lapse video with perceived playback speeds that changes within the time-lapse video.

In some implementations, determining a time-lapse video frame rate may include maintaining the time-lapse video frame rate or changing the time-lapse video frame rate. For example, determining a time-lapse video frame rate may include keeping the value of the time-lapse video frame rate constant or changing the value of the time-lapse video frame rate from one value to another value defining a different rate at which the visual content is captured as time-lapse video frames. Changing the time-lapse video frame rate may include increasing or decreasing the time-lapse video frame rate. In some implementations, the time-lapse video frame rate may be changed linearly and/or non-linearly. For example, the rate at which the time-lapse video frame rate changes may stay the same or may be different through the change. The change in the time-lapse video frame rate may be symmetrical or non-symmetrical. For example, the time-lapse video frame rate may be increased and decreased at the same rate or at different rates (e.g., decrease in time-lapse video frame rate happens more quickly than increase in time-lapse video frame rate, or vice versa).

In some implementations, the time-lapse video frame rate may be increased to be the same as the visual content playback rate (e.g., make the video appear to be played with a 1× speed) and/or may be increased above the visual content playback rate (e.g., make the video appear to be played with a 0.5× speed).

In some implementations, the time-lapse video frame rate may be determined based on user interaction with the image capture device, motion of the image capture device, analysis of content captured by the image capture device, highlight detection, and/or other information. Different user interaction with the image capture device, different motion of the image capture device, different content captured by the image capture device, and/or different lighting condition may be associated with and/or cause the image capture device to operate with different time-lapse video frame rate. Different user interaction with the image capture device, different motion of the image capture device, different content captured by the image capture device, and/or different lighting condition may be associated with and/or cause different changes in direction (increase in rate, decrease in rate) and/or amount (difference in value) of the time-lapse video frame rate.

User interaction with the image capture device may refer to a way in which a user acts or influences the image capture device. User interaction with the image capture device may include physical interaction by the user with the image capture device, such as user interacting with a physical and/or a virtual button on the image capture device.

For example, a button of the image capture device may be interacted upon by a user to provide one or more commands to the image capture device to set or change the time-lapse video frame rate. User interaction with a button may include one or more of pressing the button, pulling the button, twisting the button, flipping the button, and/or other interaction with the button. How the user interacts with a button may determine the value(s) of the time-lapse video frame rate and/or how the time-lapse video frame rate changes (e.g., increases, decreases, amount of increase/decrease, switch/cycle between set values).

A button may include a physical button, a virtual button, and/or other types of button. A physical button (hard button) may refer to a physical component of the image capture device (e.g., button 316) that may be interacted upon by a user. A virtual button (soft button) may refer to a virtual component of the image capture device (e.g., presented on the touchscreen display 314) that may be interacted upon by a user.

A button may include a button with a function dedicated to setting/changing the time-lapse video frame rate. A button may include a multi-function button with one or more of its functions dedicated to setting/changing the time-lapse video frame rate. A button may include a variable function button with its operative function changing based on user selection, image capture mode operation, and/or other information. The operative function of the button may include setting/changing the time-lapse video frame rate.

As another example, a touchscreen display of the image capture device may be interacted upon by a user to provide one or more commands to the image capture device to set or change the time-lapse video frame rate. In some implementations, user may interact with any portion of the touchscreen display to set and/or change the time-lapse video frame rate. In some implementations, interaction with specific portions with the touchscreen display may result in setting/changing the time-lapse video frame rate. In some implementations, different portions of the touchscreen display may be associated with and/or cause different setting/changing of the time-lapse video frame rate. For example, the touchscreen display may provide different virtual buttons for different time-lapse video frame rates, and user interaction with a particular virtual button may result in the corresponding time-lapse video frame rate being used to capture visual content.

In some implementations, user interaction with a touchscreen display may include tapping on the touchscreen display. A user tapping on the touchscreen display may include using one or more fingers and/or one or more tools (e.g., stylus) to momentarily touch the touchscreen display. For example, a user may tap on any portion of the touchscreen display to set and/or change the time-lapse video frame rate. As another example, a user may be required to tap on one or more specific portions of the touchscreen display to set and/or change the time-lapse video frame rate.

In some implementations, tapping on the touchscreen display may cause the time-lapse video frame rate to switch between different values. For example, tapping on the touchscreen display may cause the value of the time-lapse video frame rate to increase—change from its present value to a higher value to generate more time-lapse video frame rate during a time duration. As another example, tapping on the touchscreen display may cause the value of the time-lapse video frame rate to decrease—change from its present value to a lower value to generate fewer time-lapse video frame rate during a time duration.

In some implementations, individual tapping of the touchscreen display may cause the time-lapse video frame rate to alternate between the value before the tapping and a set value. For example, an initial tapping of the touchscreen display may cause the value of the time-lapse video frame rate to change from its present value to a lower/higher value. A subsequent tapping of the touchscreen display may cause the value of the time-lapse video frame rate to change from the lower/higher value back (revert) to the original value before the initial tapping. Multiple tapping of the touchscreen display may cause the value of the time-lapse video frame rate to alternate between two values.

In some implementations, individual tapping of the touchscreen display may cause the time-lapse video frame rate to cycle through different values. The values may be ordered from lowest value to highest value, or from highest value to lowest value. Other orderings of values are contemplated. For example, an initial tapping of the touchscreen display may cause the value of the time-lapse video frame rate to change from its present value to lower/higher value. A subsequent tapping of the touchscreen display may cause the value of the time-lapse video frame rate to change to a lower/higher value. Multiple tapping of the touchscreen display may cause the value of the time-lapse video frame rate to decrease/increase by one or more amounts (e.g., equal amounts, different amounts).

In some implementations, different numbers of fingers may be associated with different values of time-lapse video frame rates, and tapping different number of fingers on the touchscreen displays at the same time may cause the time-lapse video frame rate to change to different values. For example, tapping one finger on the touchscreen display may cause the time-lapse video frame rate to change to a value associated with one finger, and tapping two fingers on the touchscreen display may cause the time-lapse video frame rate to change to a value associated with two fingers. Usage of other numbers of fingers are contemplated.

In some implementations, user interaction with a touchscreen display may include holding one or more fingers and/or one or more tools on the touchscreen display. In some implementation, a user may tap and hold on any portion of the touchscreen display to set and/or change the time-lapse video frame rate. In some implementations, a user may be required to tap and hold on one or more specific portions of the touchscreen display to set and/or change the time-lapse video frame rate.

In some implementations, tapping and holding on the touchscreen display may cause the time-lapse video frame rate to switch between different values. For example, tapping and holding on the touchscreen display may cause the value of the time-lapse video frame rate to increase—change from its present value to a higher value to generate more time-lapse video frame rate during a time duration. As another example, tapping and holding on the touchscreen display may cause the value of the time-lapse video frame rate to decrease—change from its present value to a lower value to generate fewer time-lapse video frame rate during a time duration.

In some implementations, release of the finger from the touchscreen display may cause the time-lapse video frame rate to revert to a prior value (e.g., revert from the changed value to the original value). Tapping-holding and releasing may cause the time-lapse video frame rate to alternate between the value before the tapping-holding and a set value. For example, tapping and holding on the touchscreen display may cause the value of the time-lapse video frame rate to change from its present value to a lower/higher value. Release from the touchscreen display may cause the value of the time-lapse video frame rate to change back to the original value.

In some implementations, individual tapping-holding of the touchscreen display may cause the time-lapse video frame rate to cycle through different values. The values may be ordered from lowest value to highest value, or from highest value to lowest value. Other orderings of values are contemplated. For example, an initial tapping-holding of the touchscreen display may cause the value of the time-lapse video frame rate to change from its present value to lower/higher value. A subsequent tapping-holding of the touchscreen display may cause the value of the time-lapse video frame rate to change to a lower/higher value. Multiple tapping-holding of the touchscreen display may cause the value of the time-lapse video frame rate to decrease/increase by one or more amounts (e.g., equal amounts, different amounts).

In some implementations, different numbers of fingers may be associated with different values of time-lapse video frame rates, and tapping-holding different number of fingers on the touchscreen displays at the same time may cause the time-lapse video frame rate to change to different values. For example, tapping-holding one finger on the touchscreen display may cause the time-lapse video frame rate to change to a value associated with one finger, and tapping-holding two fingers on the touchscreen display may cause the time-lapse video frame rate to change to a value associated with two fingers. Usage of other numbers of fingers are contemplated.

In some implementations, user interaction with a touchscreen display may include moving one or more fingers and/or one or more tools along the touchscreen display. Moving a finger/tool along the touchscreen display may include placing a tip of the finger/tool on the touchscreen display and dragging the tip in one or more directions along the touchscreen display. The direction of the movement along the touchscreen display may determine whether the time-lapse video frame rate increases or decreases (direction of change in time-lapse video frame rate). For example, moving the finger/tool in a right/up direction along the touchscreen display may cause the time-lapse video frame rate to increase while moving the finger/tool in a left/down direction along the touchscreen display may cause the time-lapse video frame rate to decrease, or vice versa. Other directions of movement to control direction of change in time-lapse video frame rate are contemplated.

In some implementations, the extent and/or direction to which the value of the time-lapse video frame rate changes may depend on how the user interacted with the touchscreen display. For example, the difference between the value of the time-lapse video frame rate before and after the change in the time-lapse video frame rate (e.g., difference between the original value and the changed value) may be determined based on one or more of an amount of movement of the finger/tool along the touchscreen display, a direction of movement of the finger/tool along the touchscreen display, a speed of movement of the finger/tool along the touchscreen display, and/or other information.

User interaction with the image capture device may include audible interaction by the user with the image capture device, such as user speaking one or more commands that are detected by the image capture device. A voice command may refer to one or more words, phrases, sounds, and/or other audible commands that is associated with change in time-lapse video frame rate. A voice command may be recorded and/or detected by one or more sound sensors, such as a sound sensor of the image capture device. A voice command may set and/or change the time-lapse video frame rate. For example, different voice command may be associated with different value(s) of the time-lapse video frame rate. Different voice command may be used to increase or decrease the value of the time-lapse video frame rate. In some implementations, a voice command may include information on the value(s) of the time-lapse video frame rate. In some implementations, a voice command may include information on the amount and/or direction (increase, decrease) of the change in the value of the time-lapse video frame rate. In some implementations, a voice command may cause change in the time-lapse video frame rate between set values (e.g., cycling between slow rate and fast rate, cycling between progressively faster/slower rates, jumping between different rates). In some implementations, different voice commands (different words/phrase/sounds) may be associated with different setting of time-lapse video frame rate and/or different changes in the time-lapse video frame rate.

Motion of the image capture device may refer to translational movement of the image capture device, rotational movement of the image capture device, direction of movement of the image capture device, speed of the image capture device, acceleration of the image capture device, and/or other movement of the image capture device. The motion of the image capture device may set and/or change the time-lapse video frame rate. For example, different motion of the image capture device may be associated with different value(s) of the time-lapse video frame rate. Different motion of the image capture device may be used to increase or decrease the value of the time-lapse video frame rate. In some implementations, particular motion of the image capture device may cause change in the time-lapse video frame rate between set values (e.g., cycling between slow rate and fast rate, cycling between progressively faster/slower rates, jumping between different rates). In some implementations, different motion of the image capture device may be associated with different setting of time-lapse video frame rate and/or different changes in the time-lapse video frame rate. For instance, particular speed, acceleration, stopping, falling, and/or jump of the image capture device/subject holding the image capture device may cause different changes in the time-lapse video frame rate and/or cause the time-lapse video frame rate to change to particular values associated with the particular motion.

For example, the time-lapse video frame rate may be set and/or changed based on detection of particular motion of the image capture device. For instance, the time-lapse video frame rate may be increased to generate time-lapse video frames at a higher frequency when image capture device motion of interest is detected (e.g., falling, jumping). The time-lapse video frame rate may be decreased to generate time-lapse video frames at a lower frequency when image capture device motion of no/less interest is detected (e.g., still image capture device, steady motion)

As another example, the time-lapse video frame rate may be set and/or changed based on the amount and/or type of motion of the image capture device. For example, detection of fast motion of the image capture device may result in the time-lapse video frame rate that is higher than based on detection of slow motion of the image capture device. Time-lapse video frame rate may be adjusted based on the speed of the motion of the image capture device so that more time-lapse video frames are generated for fast motion than slow motion. As another example, detection of a particular type of motion (e.g., jumping, falling) may result in the time-lapse video frame rate changing to a predefined time-lapse video frame rate corresponding to the particular type of motion. The time-lapse video frame rate may be adjusted in accordance with the predefined time-lapse video frame rate so that different types of motion of the image capture device are captured using the corresponding/associated time-lapse video frame rate.

In some implementations, the motion of the image capture device may be used to determine periodic motion of the image capture device. Periodic motion may refer to motion (e.g., rotation) that is repeated in intervals of time. Periodic motion may cause periodic changes in the rotational position of the image capture device. Periodic changes in the rotational position of the image capture device may cause periodic changes in the direction in which the field of view of the image capture device is directed (periodic change in where the image capture device is pointed). For example, a person may be walking and/or running, and the image capture device may be held in the person's hand, mounted on the person (e.g., on the person's chest, on the person's head), and/or otherwise carried by the person. The walking and/or running of the person may case the image capture device to undergo periodic rotation.

Periodic motion of the image capture device may result in periodic moments. Periodic moments may refer to moments in time at which particular position/rotation/orientation of the image capture device is the same (e.g., being repeated). For instance, periodic moments may correspond to moments in time when the image capture device is pointed in the forward direction. Periodic motion of the image capture device may repeat at different intervals. The rate of repetition of the periodic motion may depend on the repeating interval. The time-lapse video frame rate may be set and/or changed so that visual content is captured at/during periodic moments. The time-lapse video frame rate may be set so that visual content is capture at/during every periodic moments or at certain multiples of periodic moments (e.g., every $3^{rd}$ periodic moment). Capturing the visual content at every periodic moment may correspond to the minimum speed-up required to generate a smooth (e.g., stabilized) time-lapse video. In some implementations, the visual content capture at/during periodic moments may be selected for inclusion in a time-lapse video. Such capture of visual content/generation of time-lapse video may enable generation of a smooth time-lapse video.

In some implementations, adjacent pairs of time-lapse video frames may be analyzed to determine the apparent motion between the time-lapse video frames. The apparent motion may be used to determine whether the time-lapse video frame rate is acceptable or should be changed. For example, the apparent motion between the pair(s) of time-lapse video frames may include chaotic motion, indicating that the depiction of things (e.g., scene, objects, background) captured within the pair(s) of time-lapse video frames has changed too much between the time-lapse video frames to provide a smooth time-lapse video and that the value of the time-lapse video frame rate should be increased. Chaotic motion may indicate that the environment around the image capture device changed greatly during moments at which the pair(s) of time-lapse video frames are captured, and that the time-lapse video frames should be captured/selected with smaller time interval.

For instance, while the periodic motion of the image capture device may indicate that the time-lapse video frame rate may be set to a certain value, the value set based on the periodic motion may be too low (the interval between time-lapse video frames are too long) and may result in the time-lapse video frames being generated too far apart to provide a smooth time-lapse video. For example, the time-lapse video frames may be generated between too much changes in the environment of the image capture device, which may cause the time-lapse video to appear erratic and/or chaotic.

The time-lapse video frame rate may be adjusted based on the apparent motion between the pair(s) of time-lapse video frames. The value of the time-lapse video frame rate may be increased (resulting in more frequent generation of time-lapse video frames) based on the apparent motion including large amount of motion (e.g., above a threshold level) and indicating that the time-lapse video frame rate is too low. The value of the time-lapse video frame rate may be decreased (resulting in less frequent generation of time-lapse video frames) based on the apparent motion including small amount of motion (e.g., lower than a threshold level same as or different than the threshold level used to detect large amount of motion) and the periodic motion of the image capture device allowing for lower time-lapse video frame rate. Thus, the time-lapse video frame rate may be dynamically set/adjusted based on the periodic motion of the image capture device and the apparent motion between pair(s) of time-lapse video frames to generate smooth time-lapse videos.

Analysis of content captured by an image capture device may include analysis of visual content, audio content, and/or other content captured by the image capture device. Analysis of content may include examination, evaluation, processing, studying, and/or other analysis of one or more features/characteristics of the content.

For example, the time-lapse video frame rate may be set and/or changed based on visual content detection. Visual content detection may refer to detection of content within the visual content. Visual content detection may include identification of things within the visual content (e.g., face recognition, object recognition, scene recognition, emotion recognition), the quality and/or number of things within the visual content (e.g., number of faces, number of objects, level of emotion, amount of motion), and/or other characteristics relating to things within the visual content.

For example, the time-lapse video frame rate may be set and/or changed based on detection of particular objects (e.g., persons, faces), and/or detection of motion within the visual content. For instance, the time-lapse video frame rate may be increased to capture visual content at a higher frequency when person and/or faces are detected. For instance, time-lapse video frame rate may be increased to be the same as the visual content playback rate (e.g., make the video content appear to be played with a 1× speed) and/or may be increased above the visual content playback rate (e.g., make the video content appear to be played with a 0.5× speed). The time-lapse video frame rate may be decreased to capture visual content at a lower frequency when nothing of interest is detected within the visual content and/or the interest level of captured content is low.

The time-lapse video frame rate may be set and/or changed to match the amount and/or type of motion detected within the visual content. For example, detection of fast motion in the visual content may result in the time-lapse video frame rate increasing more than detection of slow motion in the visual content. The time-lapse video frame rate may be set and/or adjusted to match the speed of the motion detected within the visual content so that more images/video frames including depiction of the fast motion are captured. As another example, detection of a particular type of motion (e.g., jumping, falling, interacting with a device) may result in the time-lapse video frame rate changing to a predefined time-lapse video frame rate corresponding to the particular type of motion. The time-lapse video frame rate may be adjusted in accordance with the predefined time-lapse video frame rate so that different types of motion are captured using the corresponding/associated capture rates. Other changes in the time-lapse video frame rate are contemplated.

As another example, the time-lapse video frame rate may be set and/or changed based on detection of particular sounds within the audio content. For instance, the time-lapse video frame rate may be increased to capture visual content at a higher frequency when sound corresponding to exciting or fast activity is detected while the time-lapse video frame rate may be decreased to capture visual content at a lower frequency when sound corresponding to exciting/fast activity is not detected and/or sound corresponding to slow activity is detected.

Highlight detection may refer to identification of occurrence of a highlight moment. A highlight moment may refer to a moment at which a highlight event occurs. A highlight event may refer to an exciting, interesting, and/or an important event, such as a high point or a climax of an activity being performed by one or more users. A highlight event may be an event of interest. A highlight event/moment may be detected based on analysis of the visual content (e.g., blur detection, color analysis, face recognition, histogram analysis, object recognition, activity recognition, scene recognition, salience detection, emotion recognition), analysis of the audio content (e.g., voice recognition, command recognition, activity recognition, emotion detection), analysis of user input (e.g., a user interacting with a highlight button), analysis of metadata relating to the visual content/audio content (e.g., telemetry data, GPS data, IMU data, speed data, velocity data, acceleration data, rotation data), and/or other information. In some implementations, metadata may be stored in a separate metadata track of the content container (e.g., mp4 container including visual content, and/or audio content).

Examples of metadata may include: telemetry data (such as motion data, velocity data, and acceleration data) captured by sensor(s) on the image capture device; location information captured by a GPS receiver of the image capture device; compass heading information; altitude information of the image capture device; biometric data such as the heart rate of the user, breathing of the user, eye movement of the user, body movement of the user; vehicle data such as the velocity or acceleration of the vehicle carrying the image capture device; the brake pressure of the vehicle, or the rotations per minute (RPM) of the vehicle engine; and/or environment data such as the weather information associated with the capture of the video.

For example, a highlight event/moment may include events of interest within the captured video, captured scenes associated with certain metadata (such as an above threshold altitude or speed), captured scenes associated with certain image capture device and/or environment characteristics, and/or other content. In some implementations, the metadata may be captured by the image capture device during capture of the video and/or may be retrieved from one or more other metadata sources (e.g., after capture of the video). In some implementations, metadata associated with the video may be used to identify highlight events/moments without relying on image processing techniques or manual highlight detection by a user.

In some implementations, metadata may include information about the video/the capture of the video, the content of the video, the image capture device used to capture the video, the environment or setting in which the video is captured, and/or other information associated with the capture of the video. For example, metadata may include acceleration data representative of the acceleration of an image capture device carried by a user as the user captures a video while snowboarding down a mountain. Such acceleration metadata may facilitate identification of highlight events/moments including a sudden change in acceleration during the capture of the video. Sudden changes in acceleration during the capture of the video may indicate that the user has performed a jump or crashed. Motion data associated with a high altitude, a mountain location, and a parabolic upward and then downward velocity may be identified as a "snowboarding jump" while motion data associated with a low altitude, a water location, and a parabolic upward and then downward velocity may be identified as a "surfing jump." A sudden slowdown in velocity and accompanying negative acceleration may be identified as a "crash". Identification of other events/moments are contemplated.

One or more criteria may be used to identify highlight events/moments. Example criteria for identifying highlight events/moments may include: a greater than threshold change in acceleration or velocity within a pre-determined period of time, a maximum or above-threshold velocity or acceleration, a maximum or local maximum altitude, a maximum or above-threshold heart rate or breathing rate of a user, a maximum or above-threshold audio magnitude, a capture location being within a predetermined threshold distance from a pre-determined location, a threshold change in or pre-determined orientation of the image capture device, a proximity to another image capture device or location, a capture time within a threshold of a pre-determined time, a pre-determined environmental condition (such as a particular weather event, a particular temperature, a sporting event, a human gathering, or any other suitable event. Other criteria for identifying highlight events/moments are contemplated.

In some implementations, highlight events/moments may be identified based on an interest curve. An interest curve may characterize different levels of interesting things captured within the video at different moments based on values of the interest curve. In some implementations, highlight events/moments may be identified based on the shape of the interest curve. Using shape of the interest curve to determine highlight moments may facilitate identification of moments of different qualities in terms of values of the interest curve. For example, highlight events/moments may be identified to at a local maximum, a global maximum, a local minimum, and/or a global minimum of the interest curve. As another example, highlight events/moments may be identified at portions of the interest curve that have values higher/lower than a threshold hold. As another example, highlight events/moments may be identified at leveled portions of the interest curve—portions of the interest curve that maintains a certain range of interest values over a certain range of time.

In some embodiments, highlight events/moments may be identified based on a reverse of identification of non-highlight events/moments. Analysis of the visual content, analysis of the audio content, analysis of user, analysis of metadata relating to the visual content/audio content, and/or other information may be used to identify when highlight events/moments do not occur. For example, capture of video associated with a below-threshold movement, a below-threshold luminosity, a lack of faces or other recognizable objects within the visual content, audio content that does not include dialogue or other notable sound effects may be used to identify non-highlight events/moments. The inverse of the non-highlight events/moments portions may be identified as including or potentially including highlight events/moments.

In some implementations, other information may be used to detect occurrences of events of interest. For example, location of the image capture device, motion of the image capture device, and/or other metadata/telemetry associated with the image capture device may be used to detect occurrences of events of interest. Detection of occurrences of events of interest/highlight moments may be used to determine/change time-lapse video frame rate. For example, the time-lapse video frame rate may be set to a high value and/or increased based on detection of highlight moments while the time-lapse video frame rate may be set to a low value and/or decreased based on non-detection of highlight moments. In some implementations, different highlight moments may be associated with different time-lapse video frame rate. In some implementations, the length of time for which a highlight moment sets/changes the time-lapse video frame rate may depend on the type of highlight moment. For example, a particular highlight moment may correspond to a short activity, and the time-lapse video frame rate may be set to the corresponding value for a short time duration of the short activity. Another highlight moment may correspond to a longer activity, and the time-lapse video frame rate may be set to the corresponding value for a longer time duration of the longer activity.

In some implementations, change in the time-lapse video frame rate may be applied to moments preceding the user interaction with the image capture device, motion of the image capture device, analysis of content captured by the image capture device, highlight detection, and/or other things that prompted the change in the time-lapse video frame rate. The extent (length, duration of time) to which the change in the time-lapse video frame is applied to moments preceding the particular trigger may be determined based on user input, system default, type of prompt to change the time-lapse video frame rate, and/or other information.

For change in time-lapse video frame rate that decreases the time-lapse video frame rate, one or more of the time-lapse video frames generated before the prompt to change the time-lapse video frame rate may be removed from inclusion in the time-lapse video. Such removal of the time-lapse video frames may effectuate backward application of decreased time-lapse video frame rate to already generated time-lapse video frames.

For change in time-lapse video frame rate that increases the time-lapse video frame rate, the time-lapse video frames may be generated from visual content stored in one or more buffers. The visual content may be captured at a rate faster than the time-lapse video frame rate. The visual content may be stored in a buffer for a duration. To apply a faster time-lapse video frame rate to moments before the prompt to change the time-lapse video frame rate, some or all of the visual content stored in the buffer may be used to generate the time-lapse video frame rates. The visual content stored in the buffer may be used to generate time-lapse video frames that were not generated based on time-lapse video frame rate before the activation of the trigger. The visual content stored in the buffer may be used to generate time-lapse video frames in accordance with the increased time-lapse video frame rate.

In some implementations, the value(s) (e.g., initial value) of the time-lapse video frame rate may be set based on an environment in which the visual content is captured by the image capture device and/or other information. The environment may refer to the surroundings, conditions, and/or physical area in which the visual content is captured by the image capture device. Different values of time-lapse video frame rate may be appropriate for different environments of visual content capture. For example, a perceived-playback speed of 8× in time-lapse video may be too fast for indoor visual content and may be too slow for outdoor visual content capture. For instance, same amount of translational movement indoor and outdoor may result in different changes in the observed surrounding of the image capture device.

For example, forward movement of ten feet indoor may result in large change in the observed surrounding of the image capture device while forward movement of ten feet outdoor may result in small change in the observed surrounding of the image capture device. Different changes in the observed surrounding of the image capture device in different environment may be due to different proximity of the environment to the image capture device, with things close to the image capture device resulting in greater changes in observed surrounding of the image capture device and things farther away from the image capture device resulting in smaller changes in the observed surrounding of the image capture device for same amount of image capture device movement. Thus, the environment in which the visual content is captured may be used to determine the initial value of the time-lapse video frame rate (e.g., faster value for indoor, smaller value for outdoor). For example, the time-lapse video frame rate may be set for indoor capture to generate a time-lapse video with a perceived-playback speed of 5× and may be set for outdoor capture to generate a time-lapse video with a perceived-playback speed of 10×. Other time-lapse video frame rates are contemplated.

In some implementations, the environment in which the visual content is captured by the image capture device may be determined based on one or more of an exposure, a white balance, and/or a scene classification of the visual content captured by the image capture device. Such determination of the environment may be used to determine the time-lapse video frame rate in place of environment depth measurement. That is, rather than determining how far/close things are located in relation to the image capture device in the environment, the exposure, the white balance, and/or the scene classification may be used as a substitute in determining how far things are likely located in relation to the image capture device.

In some implementations, one or more of the time-lapse video frames may be stabilized based on a punchout of the captured visual content. Rather than using the entire visual content captured by the image capture device, one or more portions of the visual content may be punched out (using a viewing window) to provide stabilization of the visual content within the time-lapse video frames. Stabilization of visual content may be performed based on placement of the viewing window within the field of view of the visual content. Stabilization of visual content may include using smaller spatial extents of the visual content to provide a punchout view of the visual content that creates a more stable view than when viewing the entirety of the visual content.

A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial extents of the visual content. Inclusion of the extent(s) of the visual content within the punchout/viewing window may effectuate stabilization of the visual content via selective cropping.

The placement of the viewing window may compensate for the motion (e.g., unintentional motion) of the image capture device during the capture duration. The placement of the viewing window may reduce, remove, and/or smooth the motion present in the visual content due to different translational and/or rotational positions of the image capture device when it captured the visual content. For example, a viewing window having a smaller size than the field of view of the visual content may be used to provide a punchout of the visual content. The punchout (cropped view) may be moved within the field of view to provide a stabilized view of the visual content.

The viewing window may be oriented with respect to the field of view of the visual content to provide a punchout of the visual content that is stable/smooth with respect to prior and/or next punchout of the visual content. For example, the viewing window may be oriented with respect to the field of view of images captured by the image capture device to provide a punchout of the images such that the visual content within the viewing window appears to have been captured with a stable/more stable image capture device (e.g., a punchout of a video frame being stable/more stable with a punchout of the preceding video frame and/or a subsequent video frame).

The visual content component 104 may be configured to capture the visual content during one or more visual capture durations based on the time-lapse video frame rate and/or other information. A visual capture duration may refer to a time duration in which visual content is captured. A visual capture duration may extend from a visual capture start point to a visual capture end point. A visual capture duration may span a time duration that starts at the visual capture start point and ends at the visual capture end point. The value(s) of the time-lapse video frame rate may stay the same or change during a visual capture duration.

Capturing the visual content during a visual capture duration may include recording, storing, and/or otherwise capturing the visual content for use in generating video content. For example, during a visual capture duration, the visual content component 104 may use the visual output signal generated by the image sensor 15 and/or the visual information conveyed by the visual output signal to record, store, and/or otherwise capture the visual content for use in generating video content. For instance, the visual content component 104 may store, in the electronic storage 13 and/or other (permanent and/or temporary) electronic storage medium, information (e.g., the visual information) defining the visual content based on the visual output signal generated by the image sensor 15 and/or the visual information conveyed by the visual output signal during the visual capture duration. In some implementations, information defining the captured visual content may be stored in one or more visual tracks.

Capturing visual content based on the time-lapse video frame rate may include capturing visual content at moments in accordance with the time-lapse video frame rate. The visual content may be captured for inclusion in time-lapse video frames. Capturing the visual content based on the time-lapse video frame rate may include recording, storing, and/or otherwise capturing the visual content at the rate defined by the time-lapse video frame rate. The time-lapse video frame rate may be used to determine, based on moment of capture, which visual content will be included in the time-lapse video as time-lapse video frames. Capturing the visual content based on the time-lapse video frame rate may include capturing the visual content at different moments within the capture duration, with the moments determined based on the time-lapse video frame rate. Capturing the visual content based on the time-lapse video frame rate may include generating time-lapse video frames to include visual content from different moments, with the moments determined based on the time-lapse video frame rate.

Capture of the visual content based on the time-lapse video frame may include selection of time-lapse video frames from images/portions of images captured by the image capture device based on the time-lapse video frame rate. For example, the image sensor 15 may operate at a higher rate than the time-lapse video frame rate. The image sensor 15 may generate visual output signals (conveying visual information defining visual content) at a rate faster than the time-lapse video frame rate. For example, the image sensor 15 may operate at 60 frames per second to generate 60 images per second while the time-lapse video frame rate may be slower (e.g., 30 frames per second). The capture of the visual content as the time-lapse video frames may include selection of fewer than all images generated by the image sensor for generation of the time-lapse video frames. For example, 30 of every 60 images captured by the image sensor 15 may be selected for use in generating time-lapse video frames. In some implementations, the images may be selected as time-lapse video frames and/or for the generation of the time-lapse video frames based on motion of the image capture device and/or other information. For example, the images may be selected based on the periodic motion of the image capture device and/or apparent motion between the images/time-lapse video frames to enable stabilization of the time-lapse video frames. Other capture of visual content is contemplated.

Capture of the visual content by the visual content component 104 during a visual capture duration may be separate from use of the visual content for other purposes, such as monitoring and/or analyzing the visual content for determining the time-lapse video frame rate. For example, the time-lapse video frame rate may be determined based on detection of particular objects, events, and/or motion within the visual content. A feed of visual content (e.g., of images, video frames) conveyed by the visual output signal may be monitored, analyzed, and/or otherwise used to detect the presence of the objects, events, and/or motion within the visual content. Visual content captured by the image sensor 15 may be temporarily stored (e.g., in one or more buffers) for visual content analysis (e.g., detection of objects, events, and/or motion). Visual content captured by the image sensor 15 outside a visual capture duration may be deleted and/or otherwise removed from electronic storage (e.g., after monitoring/analysis of the visual content).

Figure 4:
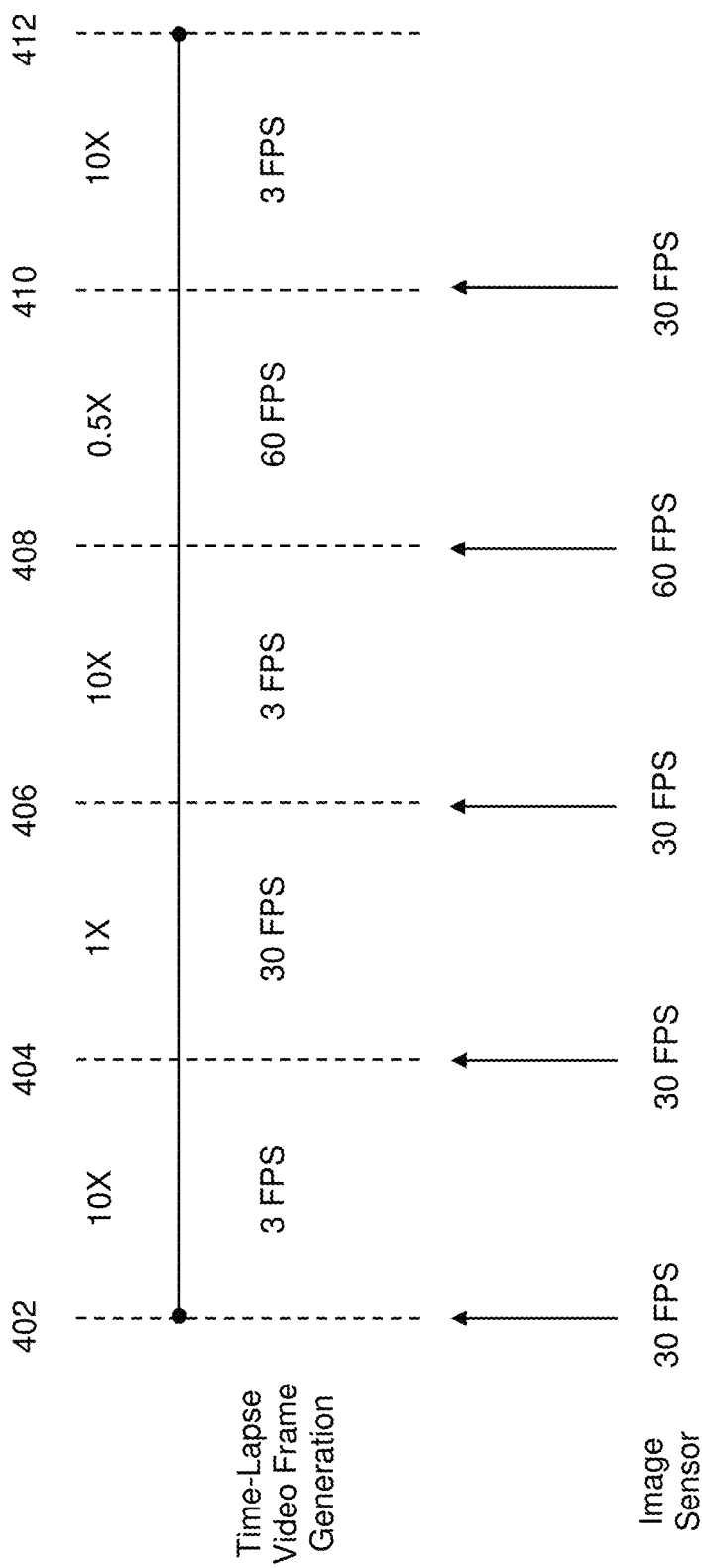
FIG. 4 illustrate example frame rates for image sensor and time-lapse video frame generation.

FIG. 4 illustrate example frame rates for image sensor (e.g., the image sensor 15) and time-lapse video frame generation. As shown in FIG. 4, at a moment 402, the image sensor may be operating at a particular rate to generate 30 images per second. The rate of image generation may be the same as the visual content playback rate (30 frames per second). The time-lapse video frame rate may be set so that 3 time-lapse video frames are generated per second. Time-lapse video frames may be generated so that the corresponding portion of the time-lapse video has a perceived playback rate of 10×. At a moment 404, the time-lapse video frame rate may be increased to be the same as the visual content playback rate. Time-lapse video frames may be generated so that the corresponding portion of the time-lapse video has a perceived playback rate of 1×. At a moment 406, the time-lapse video frame rate may revert to generating 3 time-lapse video frames per second, resulting in the corresponding portion of the time-lapse video to have a perceived playback rate of 10×.

At a moment 408, the time-lapse video frame rate may increase by a factor of 20 so that 60 time-lapse video frames are generated per second. This may result in the corresponding portion of the time-lapse video has a perceived playback rate of 0.5×. To enable generation of time-lapse video frames at 60 FPS (frames per second), the operation of the image sensor may be changed to increase the rate at which the image sensor generates images. For example, the rate of the image sensor may be increased to match the time-lapse video frame rate of 60 FPS. As another example, the rate of the image sensor may be increased beyond the time-lapse video frame rate (e.g., 120 FPS). At a moment 410, time-lapse video frame rate may be decreased so that the corresponding portion of the time-lapse video has a perceived playback rate of 10×. Responsive to the time-lapse video frame rate being lower than 30 FPS (visual content playback rate, 1× capture rate), the rate at which the image sensor is operating may be decreased to 30 FPS.

Such dynamic changes in the values of the time-lapse video frame rate may enable more dynamic time-lapse videos to be created. For example, the example frame rates for image sensor (e.g., the image sensor 15) and time-lapse video frame generation shown in FIG. 4 may correspond to operation of an image capture during an activity, such as a marathon. The moment 402 may correspond to a beginning portion of the marathon in which runners are moving along the route, with no particular exciting footage. The image capture device may capture visual content depicting the portion of the marathon from the moment 402 to the moment 404 at a 10× capture rate so that the corresponding portion of the time-lapse video is played with a perceived playback speed of 10×. The moment 404 may correspond to an interesting event that happened during the marathon (e.g., passing an interesting sight, passing an important point in the route). The image capture device may capture visual content depicting the portion of the marathon from the moment 404 to the moment 406 at a 1× capture rate so that the corresponding portion of the time-lapse video is played with a perceived playback speed of 1×. The moment 406 may correspond to the end of the interesting event, and the image capture device may capture visual content depicting the portion of the marathon from the moment 406 to the moment 408 at a 10× capture rate so that the corresponding portion of the time-lapse video is played with a perceived playback speed of 10×. The moment 408 may correspond to another interesting event that happened during the marathon (e.g., falling, crossing the finish line). The image capture device may capture visual content depicting the portion of the marathon from the moment 408 to the moment 410 at a 0.5× capture rate so that the corresponding portion of the time-lapse video is played with a perceived playback speed of 0.5×. The moment 410 may correspond to the end of the interesting event, and the image capture device may capture visual content depicting the portion of the marathon from the moment 410 to the moment 412 at a 10× capture rate so that the corresponding portion of the time-lapse video is played with a perceived playback speed of 10×. Other scenarios of time-lapse video capture and other time-lapse video frame rates are contemplated.

The audio content component 106 may be configured to capture the audio content during one or more audio capture durations based on the time-lapse video frame rate and/or other information. An audio capture duration may refer to a time duration in which audio content is captured. An audio capture duration may extend from an audio capture start point to an audio capture end point. An audio capture duration may span a time duration that starts at the audio capture start point and ends at the audio capture end point. The value(s) of the time-lapse video frame rate may stay the same or change during an audio capture duration. Capturing the audio content during an audio capture duration based on the time-lapse video frame rate may include determine the audio capture duration based on the time-lapse video frame rate. For example, the audio content component 106 may capture audio content based on the time-lapse video frame rate being a particular value and/or falling within a particular range of values. The audio content component 106 may not capture audio content based on the time-lapse video frame rate not being a particular value and/or not falling within a particular range of values. Thus, the capture of the audio content may be turned on or off depending on the value(s) of the time-lapse video frame rate.

For example, the capture of the audio content may be turned on/activated or off/deactivated depending on whether the time-lapse video frame rate matches a target time-lapse video frame rate. A target time-lapse video frame rate may refer to the time-lapse video frame rate at which the audio content is captured (the capture of the audio content is turned on/activated). The time-lapse video frame rate may include a single value or multiple values. For example, the target time-lapse video frame rate may include a single value, such as the value corresponding to the visual content playback rate. That is, the single value of the target time-lapse video frame rate may be the same as the value of the visual content playback rate (defining a rate at which the visual content is presented on playback). In such a case, the audio content may be captured for portions of the time-lapse video in which the time-lapse video is being captured/generated at 1× capture rate. Such capture of audio content may enable generation of a time-lapse video that includes audio for portions of the time-lapse video having a perceived speed of playback of 1×.

As another example, the target time-lapse video frame rate may include multiple values. The multiple values may define different values of the target time-lapse video frame rate. In such a case, the audio content may be captured for the portions of the time-lapse video in which the video is being captured/generated at one of the multiple values. For instance, a user may wish to have audio for portions of the time-lapse video captured/generated at 0.5× capture rate and 1× capture rate. Such capture of audio content may enable generation of a time-lapse video that includes audio for portions of the time-lapse video having a perceived speed of playback of 1× and for portions of the time-lapse video having a perceived speed of playback of 0.0.5×.

As yet another example, the multiple values may define one or more ranges of values of the target time-lapse video frame rate. A range of values may be defined by a lower value and a higher value. A range of values may include or exclude the lower value and/or the higher value. In such a case, the audio content may be captured for the portions of the time-lapse video in which the video is being captured/ generated within the range of values. For instance, a user may wish to have audio for portions of the time-lapse video captured/generated at between 0.5× capture rate and 1× capture rate. Such capture of audio content may enable generation of a time-lapse video that includes audio for portions of the time-lapse video having a perceived speed of playback of between 0.5× and 1×. Other target time-lapse video frame rates are contemplated.

Figure 5:
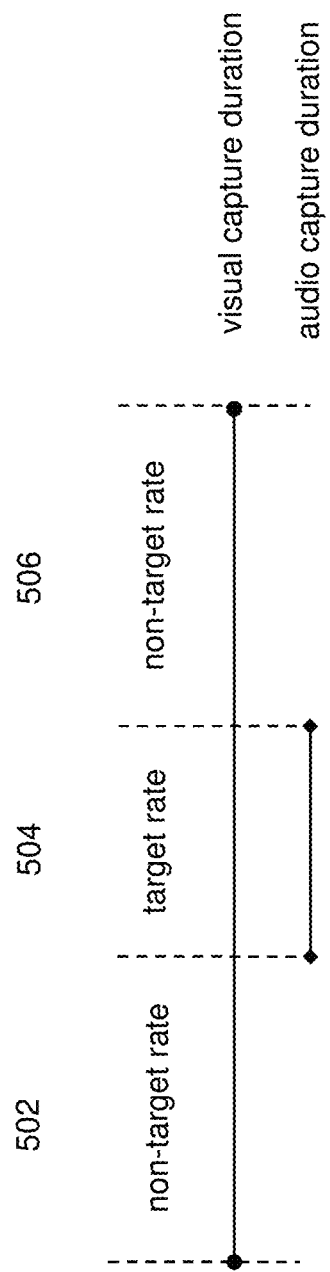
FIG. 5 illustrate example visual capture duration and audio capture duration.

FIG. 5 illustrate example visual capture duration and audio capture duration. Durations 502, 506 may be durations of time in which the time-lapse video frame rate is a non-target rate (not matching the target time-lapse video frame rate, not being the same as the target time-lapse video frame rate, not falling within a range of the target time-lapse video frame rate). A duration 504 may be a durations of time in which the time-lapse video frame rate is a target rate (matching the target time-lapse video frame rate, being the same as the target time-lapse video frame rate, falling within a range of the target time-lapse video frame rate). The visual capture duration may include the durations 502, 504, 506. Responsive to the time-lapse video frame rate matching the target time-lapse video rate during the duration 504, the audio content may be captured during the duration 504. Responsive to the time-lapse video frame rate not matching the target time-lapse video rate during the durations 502, 506, the audio content may not be captured during the durations 502, 506.

In some implementations, capture of the audio content during the audio capture duration based on the time-lapse video frame rate may include determination of when the time-lapse video frame rate has changed into the target time-lapse video frame rate and when the time-lapse video frame rate has changed from the target time-lapse video frame rate to a different time-lapse video frame rate (non-target time-lapse video frame rate). Responsive to the determination that the time-lapse video frame rate has changed into the target time-lapse video frame rate, the capture of the audio content may be started. Responsive to the determination that the time-lapse video frame rate has changed from the target time-lapse video frame rate to the different time-lapse video frame rate, the capture of the audio content may be stopped.

For example, referring to FIG. 4, the target time-lapse video frame rate may be 30 FPS. The frame rate component 102 may determine that the time-lapse video frame rate has changed from 3 FPS to 30 FPS at the moment 404. Responsive to the determination that the time-lapse video frame rate has changed into the target time-lapse video frame rate of 30 FPS, the audio content component 106 may start capture of audio content at the moment 404. The frame rate component 102 may determine that the time-lapse video frame rate has changed from 30 FPS to 3 FPS at the moment 406. Responsive to the determination that the time-lapse video frame rate has changed from the target time-lapse video frame rate of 30 FPS to a different time-lapse video frame rate of 3 FPS, the audio content component 106 may stop capture of audio content at the moment 406.

Capturing the audio content during an audio capture duration may include recording, storing, and/or otherwise capturing the audio content for use in generating video content. For example, during an audio capture duration, the audio content component 106 may use the sound output signal generated by the sound sensor 16 and/or the audio information conveyed by the sound output signal to record, store, and/or otherwise capture the audio content for use in generating video content. The audio content component 106 may use the audio output signal generated by the sound sensor 16 and/or the audio information conveyed by the sound output signal during an audio capture duration to record, store, and/or otherwise capture the audio content for use in generating video content. For instance, the audio content component 106 may store, in the electronic storage 13 and/or other (permanent and/or temporary) electronic storage medium, information (e.g., the audio information) defining the audio content based on the sound output signal generated by the sound sensor 16 and/or the audio information conveyed by the sound output signal during the audio capture duration. In some implementations, information defining the captured audio content may be stored in one or more audio tracks.

An audio track may be different from a visual track in which information defining the captured visual content may be stored. In some implementations, information defining audio content captured during different audio capture durations may be stored in different audio tracks. In some implementations, sources of the captured audio content (e.g., a person speaking, background/ambient noise, sound from an activity) may be identified, and information defining audio content captured from different sources may be stored in different audio tracks. In some implementations, different types of voices and/or speech may be stored in different audio tracks. For example, sounds of one or more persons laughing, crying, screaming, shouting, and/or otherwise speaking for short durations of time may be stored in different audio track from sounds of one or more persons speaking for longer durations of time. For instance, narration by one or more persons may be stored in one or more audio tracks different from other sounds.

In some implementations, capture of different types of sounds/audio may be indicated by user input. For example, an image capture device may include/provide one or more options (e.g., physical button(s), virtual button(s) presented on a display), which may be activated by a user to indicate the type of sounds/audio being captured. For instance, an image capture device may include one or more narration options (e.g., narration button(s)), which may be activated by a user to indicate that narration/narration of particular type is being captured. Other types of options to indicate other types of sounds/audio are contemplated.

Capturing the audio content may be separate from use of the audio content for other purposes, such as monitoring and/or analyzing the audio content for detecting one or more moments of interest. For example, the time-lapse video frame rate may be determined based on detection of particular objects, events, and/or motion within the visual content. A feed of visual content (e.g., of images, video frames) conveyed by the visual output signal may be monitored, analyzed, and/or otherwise used to detect the presence of the objects, events, and/or motion within the visual content.

For example, a feed of audio content conveyed by the sound output signal may be monitored, analyzed, and/or otherwise used to detect one or more voice commands and/or the occurrence of one or more events of interest. The voice command(s)/sounds of event(s) of interest may be captured within the audio content (e.g., the audio content including spoken voice commands, sounds of events of interest, and/or sounds indicating occurrences of events of interest). Audio content captured by the sound sensor 16 may be temporarily stored (e.g., in one or more buffers) for audio content analysis (e.g., detection of voice command, events of interest). Audio content captured by the sound sensor 16 outside an audio capture duration may be deleted and/or otherwise removed from electronic storage (e.g., after monitoring/analysis of the audio content).

The video content component 108 may be configured to generate video content of one or more time-lapse videos. A time-lapse video may have a visual content playback rate that is faster than the time-lapse video frame rate for at least a part of the progress length of the video content. That is, the time-lapse video may include one or more parts in which the video has a perceived playback speed greater than 1×, which provide sped-up view of the captured visual content. In some implementations, the time-lapse video frame rate may match the visual content playback rate for at least a part of the progress length of the video content. That is, the time-lapse video may include one or more parts in which the video has a perceived playback speed of 1×, which provide normal speed view of the captured visual content. In some implementations, the time-lapse video frame rate may be faster than the visual content playback rate for at least a part of the progress length of the video content. That is, the time-lapse video may include one or more parts in which the video has a perceived playback speed less than 1×, which provide slowed-down view of the captured visual content.

The video content component 108 may generate the video content of time-lapse video(s) based on captured visual content, captured audio content, and/or other information. For example, the video content generated by the video content component 108 may include the captured visual content, the captured audio content, and/or other content. The video content may define visual content viewable as a function of progress through the progress length of the video content. The captured visual content may be defined within one or more time-lapse video frames of the video content. That is, the visual content captured by the visual content component 104 during the visual capture duration(s) may be used to generate video frame(s) of the video content. The visual content captured by the visual content component 104 may form the visual content of the video frame(s) of the video content. The visual content captured by the visual content component 104 may be used to generate the visual content of the time-lapse video frame(s) of the video content.

The captured audio content may provide audio for playback of at least some of the time-lapse video frames. That is, the audio content captured by the audio content component 106 during the audio capture duration(s) may be used to generate audio/sound of the video content. The captured audio content may provide audio for playback for time-lapse video frames that were captured during the audio capture duration(s). The captured audio content may provide audio for playback along with time-lapse video frames that were captured during the audio capture duration(s). For example, a portion of the time-lapse video may include time-lapse video frames captured with the time-lapse video frame rate equal to the visual content playback rate to provide a 1× perceived speed of playback. The audio content may have been captured during 1× capture of time-lapse video frames, and the captured audio content may provide audio for playback within the corresponding portion of the time-lapse video. Such generation of a time-lapse video may enable presentation of the time-lapse video that has audio when the 1× portion of the time-lapse video is being played.

As another example, a portion of the time-lapse video may include time-lapse video frames captured with the time-lapse video frame rate within a range of rates to provide between 0.5× and 2× perceived speed of playback. The audio content may have been captured during 0.5× to 2× capture of time-lapse video frames, and the captured audio content may provide audio for playback within the corresponding portion of the time-lapse video. Such generation of a time-lapse video may enable presentation of the time-lapse video that has audio when the 0.5× to 2× portion of the time-lapse video is being played. In some implementations, the captured audio may be manipulated to extend along the corresponding portions of the time-lapse video. For example, for audio captured during the 0.5× capture of time-lapse video frames, the audio may be slowed down to provide audio for presentation of the corresponding time-lapse video frames. For audio captured during the 2× capture of time-lapse video frames, the audio may be sped-up to provide audio for presentation of the corresponding time-lapse video frames.

In some implementations, the time-lapse video may not include audio to accompany presentation of other time-lapse video frames. For example, the time-lapse video frames that were generated using the target-time-lapse video frame may be accompanied by the captured audio while the time-lapse video frames that were generated not using the target-time lapse video frame may not be accompanied by any audio, resulting in silence during those parts of the time-lapse video.

In some implementations, the time-lapse video may include other audio to accompany presentation of the time-lapse video frames. For example, the time-lapse video may include one or more soundtracks, (e.g., music, song) to provide accompaniment for some or all of the time-lapse video frames. The captured audio content may replace the soundtrack(s) and/or be mixed with the soundtrack(s). For example, the time-lapse video frames that were generated using the target-time-lapse video frame may be accompanied by the captured audio while the time-lapse video frames that were generated not using the target-time lapse video frame may be accompanied by the soundtrack(s). As another example, the time-lapse video frames that were generated using the target-time-lapse video frame may be accompanied by the captured audio and the soundtrack(s) while the time-lapse video frames that were generated not using the target-time lapse video frame may be accompanied by the soundtrack(s). In some implementations, the volume of the captured audio and/or the soundtrack(s) may be modified in mixing. For instance, the volume of the soundtrack(s) may be lowered for the portion(s) of the time-lapse video including captured audio so that the captured audio has greater emphasis during playback of portions including the captured audio. The volume of the soundtrack(s) may be increased for the portion(s) of the time-lapse video not including captured audio. Usage of other audio are contemplated.

The video content generated by the video content component 108 may be defined by time-lapse video information. Time-lapse video information defining video content of time-lapse video(s) may define an encoded version/copy of the video content/time-lapse video and/or instructions for providing playback of the video content/time-lapse video. The video content component 108 may be configured effectuate storage of the time-lapse video information and/or other information in one or more storage media. For example, the time-lapse video information may be stored in the electronic storage 13, remote storage locations (storage media located at/accessible through a server), and/or other locations. In some implementations, the video content component 108 may effectuate storage of the time-lapse video information through one or more intermediary devices. For example, the processor 11 may be located within a computing device without a connection to the storage device (e.g., the computing device lacks Wi-Fi/cellular connection to the storage device). The video content component 108 may effectuate storage of the time-lapse video information through another device that has the necessary connection (e.g., the computing device using a Wi-Fi/cellular connection of a paired mobile device, such as a smartphone, tablet, laptop, to store information in one or more storage media). Other storage locations for and storage of the time-lapse video information are contemplated.

In some implementations, visual content may include spherical visual content. Spherical visual content may include visual content viewable from one or more points of view (e.g., within a sphere, center of a sphere). Spherical visual content may refer to visual content generated through capture of multiple views from a single location. Spherical visual content may be captured through the use of one or more image capture devices to capture images from a location. The captured images may be stitched together to form the spherical visual content (spherical image). Spherical visual content may include full spherical visual content (360 degrees of capture) or partial spherical visual content (less than 360 degrees of capture). Partial spherical visual content may be referred to as panoramic visual content.

In some implementations, video content may include one or more of spherical video content, virtual reality content, and/or other video content. Spherical video content and/or virtual reality content may include visual content viewable from one or more points of view as a function of progress through the progress length of the spherical/virtual reality video content.

Spherical video content may refer to video content generated through capture of multiple views from a single location. Spherical video content may be captured through the use of one or more image capture devices to capture images/videos from a location. The captured images/videos may be stitched together to form the spherical video content. Spherical video content may include full spherical video content (360 degrees of capture) or partial spherical video content (less than 360 degrees of capture). Partial spherical video content may be referred to as panoramic video content.

Visual content of spherical video content may be included within one or more spherical video frames of the spherical video. The spherical video frame(s) may define the visual content of the video content. That is, spherical video content may include spherical video frame(s) that define the visual content of the spherical video content. Spherical video frame(s) may define visual content viewable from a point of view (e.g., within a sphere, center of a sphere) as a function of progress through the progress length of the spherical video content.

A spherical video frame may include a spherical image of the spherical video content at a moment within the progress length of the spherical video content. Visual content of spherical video content may be generated based on light received within a field of view of a single image sensor or within fields of view of multiple image sensors during a capture period. For example, multiple images/videos captured by multiple cameras/image sensors may be combined/stitched together to form the visual content of the spherical video content. The field of view of camera(s)/image sensor (s) may be moved/rotated (e.g., via movement/rotation of optical element(s), such as lens, of the image sensor(s)) to capture multiple images/videos from a location, which may be combined/stitched together to form the visual content of the spherical video content.

For example, multiple images captured by multiple cameras/images sensors at a moment in time may be combined/stitched together to form a spherical video frame for the moment in time. A spherical video frame may include a full spherical image capture (360-degrees of capture, including opposite poles) or a particular spherical image capture (less than 360-degrees of capture). A spherical image (e.g., spherical video frame) may be comprised of multiple sub-images (sub-frames). Sub-images may be generated by a single image sensor (e.g., at different times as the field of view of the image sensor is rotated) or by multiple image sensors (e.g., individual sub-images for a moment in time captured by individual image sensors and combined/stitched together to form the spherical image).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
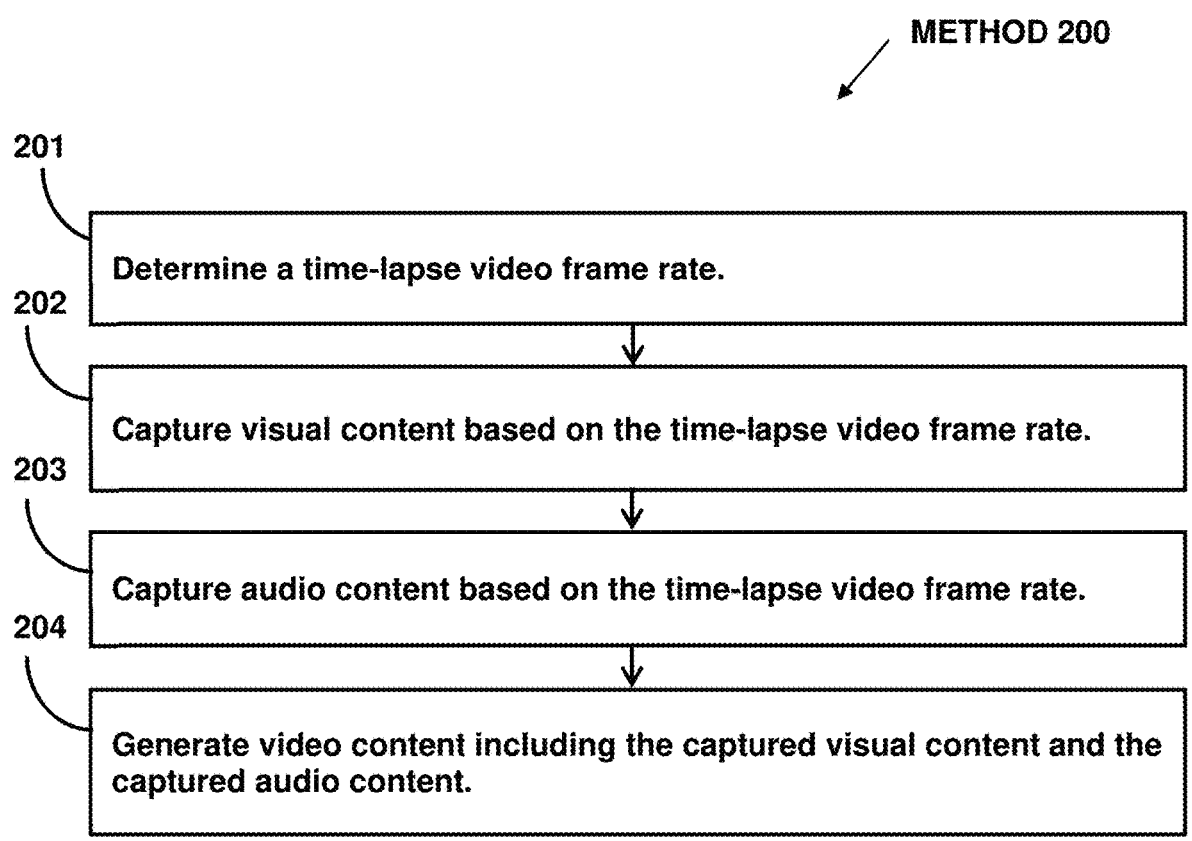
FIG. 2 illustrates an example method for generating time-lapse videos with audio.

FIG. 2 illustrates method 200 for generating time-lapse videos with audio. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include an image sensor, a sound sensor, and/or other components. The image sensor may be configured to generate a visual output signal conveying visual information based on light that becomes incident thereon. The visual information may define visual content. The sound sensor may be configured to generate a sound output signal conveying audio information based on sound received by the sound sensor. The audio information may define audio content.

At operation 201, a time-lapse video frame rate may be determined. The time-lapse video frame rate may define a rate at which visual content is captured as time-lapse video frames. In some implementations, operation 201 may be performed by a processor component the same as or similar to the frame rate component 102 (Shown in FIG. 1 and described herein).

At operation 202, the visual content may be captured during a visual capture duration based on the time-lapse video frame rate and/or other information. In some implementation, operation 202 may be performed by a processor component the same as or similar to the visual content component 104 (Shown in FIG. 1 and described herein).

At operation 203, audio content may be captured during an audio capture duration based on the time-lapse video frame rate and/or other information. In some implementations, operation 203 may be performed by a processor component the same as or similar to the audio content component 106 (Shown in FIG. 1 and described herein).

At operation 204, video content of a time-lapse video may be generated to include the captured visual content and the captured audio content. The captured visual content may be defined within the time-lapse video frames of the video content. The captured audio content may provide audio for playback of at least some of the time-lapse video frames. In some implementations, operation 204 may be performed by a processor component the same as or similar to the video content component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for generating time-lapse videos, the image capture device comprising:
    a housing;
    an image sensor carried by the housing and configured to generate a visual output signal conveying visual information based on light that becomes incident thereon, the visual information defining visual content;
    an optical element carried by the housing and configured to guide light within a field of view to the image sensor;
    a sound sensor carried by the housing and configured to generate a sound output signal conveying audio information based on sound received by the sound sensor, the audio information defining audio content; and
    one or more physical processors carried by the housing, the one or more physical processors configured by machine-readable instructions to:
        determine a time-lapse video frame rate, the time-lapse video frame rate defining a rate at which the visual content is captured as time-lapse video frames based on the visual output signal, the time-lapse video frame rate having a first value defining a first rate at which the visual content is captured as the time-lapse video frames;
        capture the visual content during a visual capture duration based on the time-lapse video frame rate;
        capture the audio content during an audio capture duration based on the time-lapse video frame rate, wherein capture of the audio content during the audio capture duration based on the time-lapse video frame rate includes:
            determination that the time-lapse video frame rate has changed into a target time-lapse video frame rate;
            responsive to the determination that the time-lapse video frame rate has changed into the target time-lapse video frame rate, start of the capture of the audio content;
            determination that the time-lapse video frame rate has changed from the target time-lapse video frame rate to a different time-lapse video frame rate; and
            responsive to the determination that the time-lapse video frame rate has changed from the target time-lapse video frame rate to the different time-lapse video frame rate, stop of the capture of the audio content; and
        generate video content of a time-lapse video, the video content including the captured visual content and the captured audio content, wherein the captured visual content is defined within the time-lapse video frames of the video content and the captured audio content provides audio for playback of at least some of the time-lapse video frames.

2. The image capture device of claim 1, wherein the target time-lapse video frame rate includes a single value.

3. The image capture device of claim 2, wherein the single value of the target time-lapse video frame rate is same as a value of a visual content playback rate, the visual content playback rate defining a rate at which the visual content is presented on playback.

4. The image capture device of claim 1, wherein the target time-lapse video frame rate includes multiple values, the multiple values defining different values of the target time-lapse video frame rate or a range of values of the target time-lapse video frame rate.

5. The image capture device of claim 1, wherein the time-lapse video frame rate is determined based on user interaction with the image capture device, motion of the image capture device, and/or analysis of content captured by the image capture device.

6. The image capture device of claim 1, wherein the time-lapse video frame rate is determined based on highlight detection.

7. The image capture device of claim 1, wherein the image sensor operates at a higher rate than the time-lapse video frame rate, and the capture of the visual content as the time-lapse video frames includes selection of fewer than all images generated by the image sensor for generation of the time-lapse video frames.

8. The image capture device of claim 7, wherein the images are selected for the generation of the time-lapse video frames based on motion of the image capture device.

9. A method for generating time-lapse videos, the method performed by an image capture device, the image capture device including one or more processors, an image sensor, an optical element, and a sound sensor, the image sensor configured to generate a visual output signal conveying visual information based on light that becomes incident thereon, the visual information defining visual content, the optical element configured to guide light within a field of view to the image sensor, the sound sensor configured to generate a sound output signal conveying audio information based on sound received by the sound sensor, the audio information defining audio content, the method comprising:
    determining a time-lapse video frame rate, the time-lapse video frame rate defining a rate at which the visual content is captured as time-lapse video frames based on the visual output signal, the time-lapse video frame rate having a first value defining a first rate at which the visual content is captured as the time-lapse video frames;
capturing the visual content during a visual capture duration based on the time-lapse video frame rate;
capturing the audio content during an audio capture duration based on the time-lapse video frame rate, wherein capturing the audio content during the audio capture duration based on the time-lapse video frame rate includes:
  determining that the time-lapse video frame rate has changed into a target time-lapse video frame rate;
  responsive to the determination that the time-lapse video frame rate has changed into the target time-lapse video frame rate, starting the capture of the audio content;
  determining that the time-lapse video frame rate has changed from the target time-lapse video frame rate to a different time-lapse video frame rate; and
  responsive to the determination that the time-lapse video frame rate has changed from the target time-lapse video frame rate to the different time-lapse video frame rate, stopping the capture of the audio content; and
generating video content of a time-lapse video, the video content including the captured visual content and the captured audio content, wherein the captured visual content is defined within the time-lapse video frames of the video content and the captured audio content provides audio for playback of at least some of the time-lapse video frames.

10. The method of claim 9, wherein the target time-lapse video frame rate includes a single value.

11. The method of claim 10, wherein the single value of the target time-lapse video frame rate is same as a value of a visual content playback rate, the visual content playback rate defining a rate at which the visual content is presented on playback.

12. The method of claim 9, wherein the target time-lapse video frame rate includes multiple values, the multiple values defining different values of the target time-lapse video frame rate or a range of values of the target time-lapse video frame rate.

13. The method of claim 9, wherein the time-lapse video frame rate is determined based on user interaction with the image capture device, motion of the image capture device, and/or analysis of content captured by the image capture device.

14. The method of claim 9, wherein the time-lapse video frame rate is determined based on highlight detection.

15. The method of claim 9, wherein the image sensor operates at a higher rate than the time-lapse video frame rate, and the capture of the visual content as the time-lapse video frames includes selection of fewer than all images generated by the image sensor for generation of the time-lapse video frames.

16. The method of claim 15, wherein the images are selected for the generation of the time-lapse video frames based on motion of the image capture device.

* * * * *